(12) United States Patent
Lee et al.

(10) Patent No.: US 8,523,680 B2
(45) Date of Patent: Sep. 3, 2013

(54) SERVICE PROVIDING METHOD USING ON-LINE GAME, AND RECORDING MEDIA RECORDING PROGRAM FOR IMPLEMENTING THE METHOD

(75) Inventors: Seung Won Lee, Seongnam-si (KR); Koo Min, Daejeon (KR)

(73) Assignee: NHN Corporation, Seongnam-si (KR)

( * ) Notice: Subject to any disclaimer, the term of this patent is extended or adjusted under 35 U.S.C. 154(b) by 199 days.

(21) Appl. No.: 12/820,984

(22) Filed: Jun. 22, 2010

(65) Prior Publication Data

US 2010/0323799 A1 Dec. 23, 2010

(30) Foreign Application Priority Data

Jun. 23, 2009 (KR) .................. 10-2009-0056012

(51) Int. Cl.
*A63F 9/24* (2006.01)
(52) U.S. Cl.
USPC .............................. 463/42; 463/31; 705/14.64
(58) Field of Classification Search
USPC ................... 463/31–42; 705/14.64; 717/173
See application file for complete search history.

(56) References Cited

U.S. PATENT DOCUMENTS

| | | | | |
|---|---|---|---|---|
| 8,075,398 B2* | 12/2011 | Beser et al. | | 463/31 |
| 2004/0015608 A1* | 1/2004 | Ellis et al. | | 709/246 |
| 2006/0105841 A1* | 5/2006 | Rom et al. | | 463/42 |
| 2007/0061201 A1* | 3/2007 | Ellis et al. | | 705/14 |
| 2007/0061202 A1* | 3/2007 | Ellis et al. | | 705/14 |
| 2008/0194332 A1* | 8/2008 | Kadikario et al. | | 463/42 |
| 2009/0054140 A1* | 2/2009 | Beser et al. | | 463/31 |
| 2009/0227378 A1* | 9/2009 | Rom et al. | | 463/42 |

FOREIGN PATENT DOCUMENTS

| | | |
|---|---|---|
| JP | 2000-29712 | 1/2000 |
| JP | 2004-298469 | 10/2004 |
| KR | 10-2008-0075882 | 8/2008 |
| KR | 10-2008-0076919 | 8/2008 |
| WO | 2007-120277 | 10/2007 |

\* cited by examiner

*Primary Examiner* — Masud Ahmed
(74) *Attorney, Agent, or Firm* — H.C. Park & Associates, PLC

(57) ABSTRACT

An approach is provided for providing a service using an on-line game capable of, maximizing effects of services associated with the on-line game, and recording media recording a program for implementing the service providing method. The service providing method may include, for example, storing, in a rendering region, game object drawing information of a game screen for the on-line game in response to a request for reproducing the game screen; hooking the rendering region to change the game object drawing information so that service object information provided from a game server is included in the game object drawing information; storing the changed game object drawing information in the rendering region; and providing the game screen by rendering the game object drawing information including the service object information stored in the rendering region.

15 Claims, 23 Drawing Sheets

SERVICE PROVIDING METHOD USING ON-LINE GAME, AND RECORDING MEDIA RECORDING PROGRAM FOR IMPLEMENTING THE METHOD

CROSS-REFERENCE TO RELATED APPLICATION

This application claims priority to and the benefit of Korean Patent Application No. 10-2009-0056012, filed on Jun. 23, 2009, which is hereby incorporated by reference for all purposes as if fully set forth herein.

BACKGROUND OF THE INVENTION

1. Field of the Invention

Exemplary embodiments of the present invention relate to an apparatus and a method for providing a service using an on-line game, and more particularly, to a service providing method using an on-line game capable of maximizing a degree of service effects using the on-line game, and recording media program for implementing the service providing method.

2. Description of the Background

Currently, the Internet has rapidly been employed by a number of Internet users to allow users rely on the Internet in various areas. Accordingly, a number of service providers have fueled this acceptance by providing specific services to the Internet users.

On-line games from among services provided through the Internet have spawned significant adoption by users due to its entertainment value, thus enabling a single user or a plurality of users to enjoy the on-line game, thereby providing more entertainment to users. Typical on-line games where services are provided through the Internet may be, for example, a typical Role-Playing Game (RPG), a Massively Multi-player Online RPG (MMORPG), a voice RPG, and a simulation RPG.

Recently, an interest of providing services using the on-line games has been increased. When the on-line game is provided along with a service, it may be advantages for companies which can utilize low costs, an effective advertising method for advertising their products with respect to a large number of customers, and game service providers may profit from the service and consequently, a costs for the services on users may be reduced due to low costs service providing method by using the Internet.

In general, service data is prepared and the prepared service data may be inserted in an on-line game program, and the inserted service data may be provided to users (gamers) during the on-line game.

However, once the on-line game is developed, and the prepared service data is implemented into the game, it is difficult to modify the service since it is undesirable to modify the on-line game program when the service data is required to be replaced with updated service data.

Accordingly, to be competitive, the advertisers need to address limitations of conventional methods to achieve goals of greater service effects with low costs service.

SUMMARY OF THE INVENTION

Exemplary embodiments of the present invention provide an apparatus, a system and a method for providing a service using an on-line game, which may maximize a degree of service utilization and service effects, and recording media recording a program for implementing the service providing method.

Additional features of the invention will be set forth in the description which follows, and in part will be apparent from the description, or may be learned by practice of the invention.

Exemplary embodiments of the present invention provide a method for providing a service using an on-line game. The method includes storing, in a rendering region, game object drawing information of a game screen in response to a request for reproducing the game screen. The method also includes hooking the rendering region to change the game object drawing information to include service object information in the game object drawing information, wherein the game object drawing information comprises the service object information that is stored in the rendering region. The method further includes providing the to game screen by rendering the game object drawing information comprising the service object information.

Exemplary embodiments of the present invention provide a method for providing a service using an on-line game. The method includes storing, in a rendering region, game object drawing information of a game screen in response to a request for reproducing the game screen. The method also includes hooking the rendering region to change the game object drawing information stored in the hooked rendering region. Service object information is included in the game object drawing information based on a user selection. The method also includes transmitting, to a game server, the changed game object drawing information comprising the service object information.

Exemplary embodiments of the present invention provide a method for providing a service using an on-line game. The method includes storing, in a sound region, game sound information corresponding to a game screen in response to a request for outputting the game sound information. The method also includes hooking the sound region where the game sound information is stored to include the game sound information in service sound information, and to store the game sound information comprising service sound information in the sound region. The method includes outputting the game sound information comprising the service sound information.

Exemplary embodiments of the present invention provide a method for providing a service using an on-line game. The method includes storing, in a sound region, game sound information corresponding to a game screen in response to a request for outputting the game sound information. The method also includes hooking the sound region where the game sound information is stored to include the game sound information in a service sound information, and to store the game sound information comprising service sound information in the sound region. The method also includes outputting the game sound information comprising the service sound information.

Exemplary embodiments of the present invention provide a method. The method includes storing, in a sound region, game sound information corresponding to a game screen of the on-line game in response to a request for outputting the game sound information. The method also includes hooking the sound region where the game sound information is stored to include service sound information in the game sound information based on a user selection. The method includes transmitting the game sound information comprising the service sound information.

Exemplary embodiments of the present invention provide a server. The server includes a rendering unit which is coupled to a database to control and to store game information into a rendering region of a game screen. The game information includes drawing information and sound information. The server also includes a hooking unit which is coupled to a processor and the hooking unit is configured to determine the rendering region and to hook the rendering region by including service information in the game information. A portion of rendering region associated with the game information is extracted and replaced with the service information which corresponds to one of the drawing information or the sound information. The determination is performed by comparing the game information and the service information according to a matching information associated with the game information and the service information. The server includes an output unit which is configured to provide the game information comprising the service information.

Exemplary embodiments of the present invention provide a system to provide a service to an on-line gamer. The system includes a database configured to store game information for delivery to an on-line game device. The system includes a processor which is coupled to the database that is provided to determine a rendering region of a screen of the game device to extract the rendering region and to insert service information into the extracted rendering region. And the determination is performed by comparing the game information and the service information according to matching information, wherein the rendering region respectively corresponds to drawing information and sound information that are stored in the database. The game information includes the service information is reproduced by the rendering region and is outputted to the on-line gamer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Advantages and features of the present invention can be understood more readily by reference to the following detailed description of exemplary embodiments and the accompanying drawings. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art.

Figure 1:
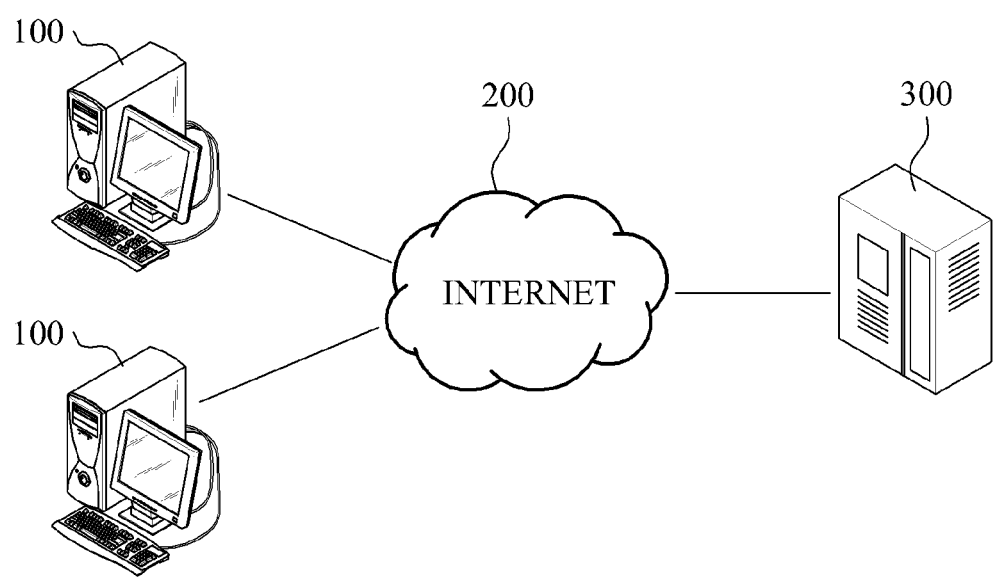
FIG. 1 is a diagram of a service providing system using an on-line game according to exemplary embodiments of the present invention.

FIG. 1 is a diagram of a service providing system using an on-line game according to exemplary embodiments of the present invention.

Referring to FIG. 1, the service providing system includes a user client 100, a network 200, and a game server 300.

The user client 100 may be coupled to the game server 300 via a network 200. As the user client 100, for example, a personal computer or a mobile phone (not shown) which are coupled to the game server 300 via the network 200 to execute an on-line game service. In some examples, the user client 100 may include any type of digital devices which are coupled to Internet using a wire/wireless such as personal digital assistants (PDA), portable multimedia players (PMP), handsets, terminals, stations, units, devices, or any type of interface to the user.

Also, the user client 100 may display a service object on a position of the game screen provided from the game server 300 while the on-line game is executed via the game server 300. The user client 100 may change a game object of the game screen to the service object in real time basis to display the service object. A service may include advertisement, message, SNS (Social Network Service), etc.

Figure 2:
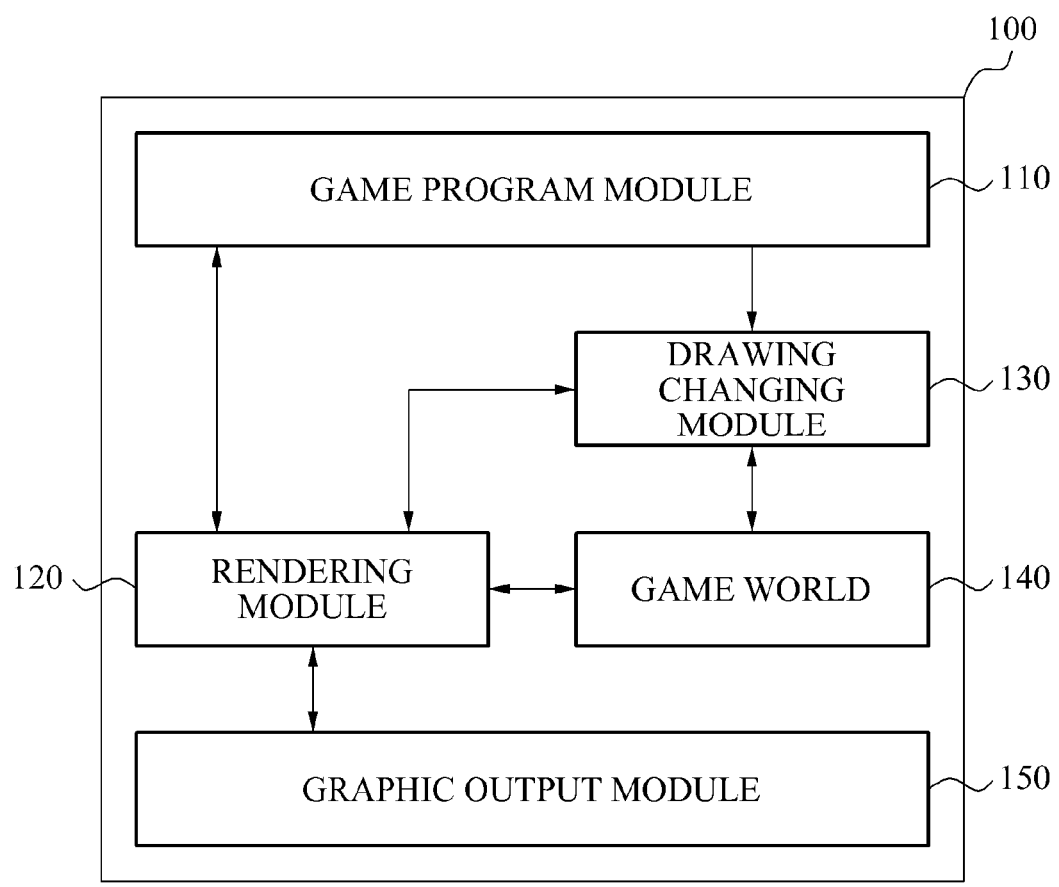
FIG. 2 is a diagram of a user client according to exemplary embodiments of the present invention.

FIG. 2 is a diagram of a user client 100 according to exemplary embodiments of the present invention. According to exemplary embodiments, as illustrated in FIG. 2, the user client 100 includes a game program module 110, a rendering module 120, a drawing changing module 130, a game world 140, and a graphic output module 150.

The game program module 110 of the user client 100 may request reproduction of the game screen for the on-line game so that the game screen may be displayed by the graphic output module 150.

Through a communication with the game program module 110 and the graphic output module 150, the rendering module 120 may control an operation of the game screen to be performed, and control a physical movement of an object (game object) to be executed in accordance with a game environment.

For this purpose, the rendering module 120 may store, in a rendering region, game object drawing information of the game screen in response to the reproduction request of the game program module 110. Also, the rendering module 120 may request the graphic output module 150 to reproduce the game screen by displaying the game object drawing information stored in the rendering region. For this purpose, the rendering module 120 may include a drawing memory (not illustrated) where the game object drawing information of the game screen is stored using a memory cue.

Also, the rendering module 120 may include a three-dimensional (3D) graphic Application Program Interface (API) for the purpose of effectively implementing a 3D graphic. In this example, as the 3D graphic API, a DirectX, and an OpenGL may be used.

The drawing changing module 130 may hook the rendering region of the rendering module 120 to change the game object drawing information so that service object information provided from the game server 300 is included in the game object drawing information, and to store the changed game object drawing information in the rendering region.

The game world 140 may be a memory region where the game screen that is implemented by the rendering module 120 and a game application related to the rendering module 120 is displayed. The game world 140 may be updated by a predetermined time interval unit, and the rendering module 120 may display, using a display apparatus of a user, the 3D graphic that is implemented in the game world 140. In this example, an entire screen of the on-line game may be implemented in the game world 140, and the rendering module 120 may display, on the display application of the user, only a screen related to a user's view from the entire screen.

The graphic output module 150 may display, on the display apparatus of the user, the game screen corresponding to the game object drawing information including the service object information stored in the rendering region in response to the reproduction request of the rendering module 120.

According to exemplary embodiments, the user client 100 may be configured differently depending on an editing mode for inserting the service object information in the game screen, or depending on a game player mode for displaying the service object information inserted in the game screen by the editing mode. Alternatively, the user client 100 may be configured capable of simultaneously using the above two modes.

Figure 3:
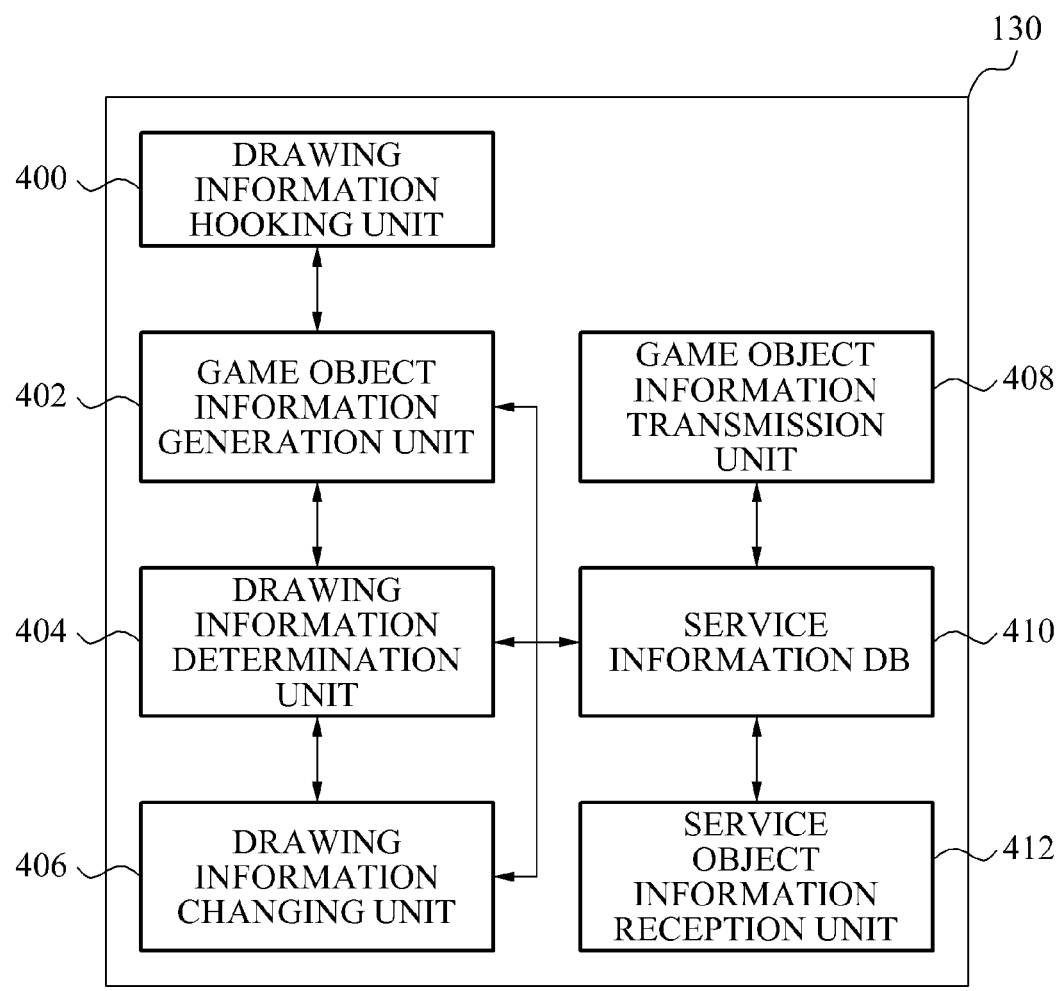
FIG. 3 is a diagram of a drawing changing module capable of changing drawing information associated with a service depending on a game player module in a user client according to exemplary embodiments of the present invention.

FIG. 3 is a diagram of a drawing changing module 130 capable of changing drawing information associated with a service depending on a game player module in the user client 100 according to exemplary embodiments of the present invention.

According to exemplary embodiments, the drawing changing module 130 may include a drawing information hooking unit 400, a game object information generation unit 402, a drawing information determination unit 404, a drawing information changing unit 406, a drawing information transmission unit 408, and a drawing information reception unit 412.

The drawing information hooking unit 400 may hook a predetermined region of a rendering region or game object drawing information to provide the hooked information to the game object information generation unit 402. In this example, the drawing information hooking unit 400 may hook the game object drawing information by a rendering function operated by the rendering module 120 that is referred to as a drawcall function.

Also, the drawing information hooking unit 400 may store, in the rendering region, the game object drawing information that is changed by the drawing information changing unit 406.

The game object information generation unit 402 may analyze the game object drawing information provided by the drawing information hooking unit 400 to extract a game object, and generate game object information corresponding to the extracted game object to store the generated game object information in a service information database 410.

Here, the game object information may include one of position information, shape information, size information, color information, texture information, index information, or any combinations thereof associated with a game world.

According to exemplary embodiments, the game object information generation unit 402 may partition the game world 140 into a plurality of section region information using an Octree Space Partition (OSP) scheme, and generate the position information from plurality of the partitioned sectional region information so that the position information may include the information with respect to the partitioned sectional region where the game object is displayed. Specifically, when a number of coordinate values to be replaced, within a corresponding region, is more than M, the game object information generation unit 402 may partition the corresponding region into 8 sectional regions using the OSP scheme. In this example, assuming that the game world 140 is a single hexahedron, each of the section regions may be partitioned once according to an x-axis direction, a y-axis direction, and a z-axis direction with respect to a center of a corresponding hexahedron. M may be adjustable, and the coordinate values to be replaced ranging from a minimum number of 0 to a maximum number of M−1 which may exist within identical sectional region information in accordance with the OSP scheme. Accordingly, the game object information generation unit 402 may store, using the service information database 410, the position information together with the sectional region information where a unique sequence that is not overlapped with the partitioned sectional region information.

The drawing information determination unit 404 may determine whether the game object drawing information is changed, by comparing the game object information stored in the service information database 410 and the service object information provided from the game server 300. Here, the service object information may include, in the same manner as that in the game object information, at least one of position information, shape information, size information, color information, texture information, or index information, on the game world for a service object.

According to exemplary embodiments, when position information of the game object information and position information of the service object information coincide with each other within the sectional region information that can be determined based on a comparison result between the position information of the game object information and the service object information, the drawing information determination unit 404 may determine insertion or replacement of the service object information to provide the determined information to the drawing information changing unit 406. In this example, to reduce a retrieval object range when performing a retrieval operation in the service information database 410, the drawing information determination unit 404 may perform the retrieval operation only on the sectional region information partitioned using the OSP scheme to determine the insertion or replacement of the service object information.

According to exemplary embodiments, the drawing information determination unit 404 may draw the position and size information of the game object information on a bounding box or a bounding sphere, and when the position information of the service object information stored in the service information database 410 exists within the bounding box or the bounding sphere, the drawing information determination unit 404 may determine the insertion or the replacement of the service object information.

In some examples, in the service information database 410, at least two coordinate information selected as a replacement object within the bounding box exists or the bounding sphere exist, the drawing information determination unit 404 may compare at least one of the shape information, the color information, the texture information, or the index information of the service object information with corresponding information of the game object information to detect an accurate single replacement object where the service object information and the game object information coincide with each other, and determine the insertion or the replacement of the service object information.

The drawing information changing unit 406 may change the game object drawing information so that, based on the determined result of the drawing information determination unit 404, the service object information may be inserted in the predetermined region of the hooked rendering region, or the game object information may be replaced with the service object information. Here, the service object information may be one of image information, moving picture information, texture information, or any combinations thereof.

The game object information transmission unit 408 may transmit the game object information generated by the game object information generation unit 402 to the game server 300.

The service object information reception unit 412 may receive, from the game server 300, the service object information corresponding to the game object information to store the received information in the service information database 410.

FIG. 4A, FIG. 4B, FIG. 4C and FIG. 4D are diagrams illustrating a process where service object information is inserted in a service providing system using an on-line game according to exemplary embodiments of the present invention.

In FIG. 4A, FIG. 4B, FIG. 4C and FIG. 4D, it is assumed that a game object displayed on a game screen of an on-line game, for example, a plurality flags 510a, 510b and 510c are changed to service object information.

Figure 4A:
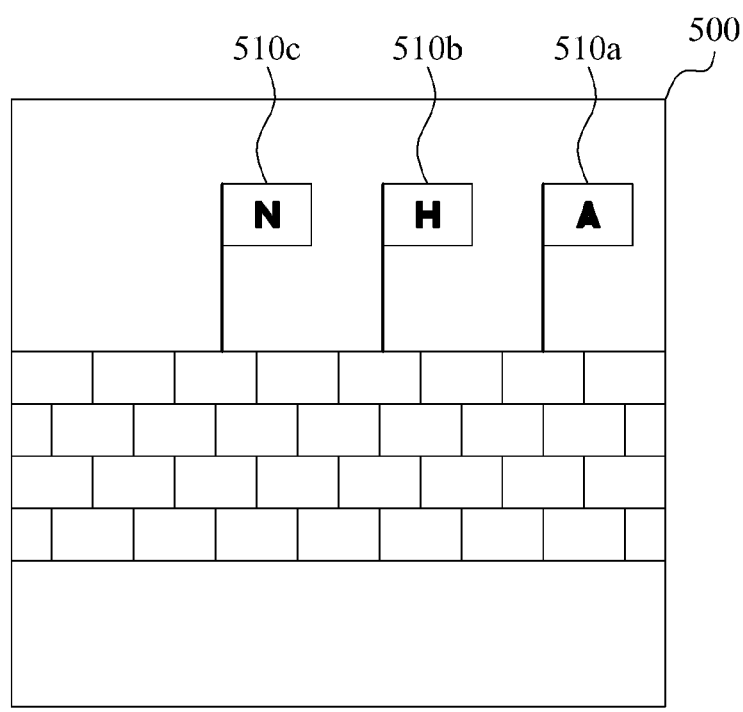
FIG. 4A, FIG. 4B, FIG. 4C and FIG. 4D are diagrams illustrating a process where service object information is inserted in a service providing system using an on-line game according to exemplary embodiments of the present invention.
Figure 4B:
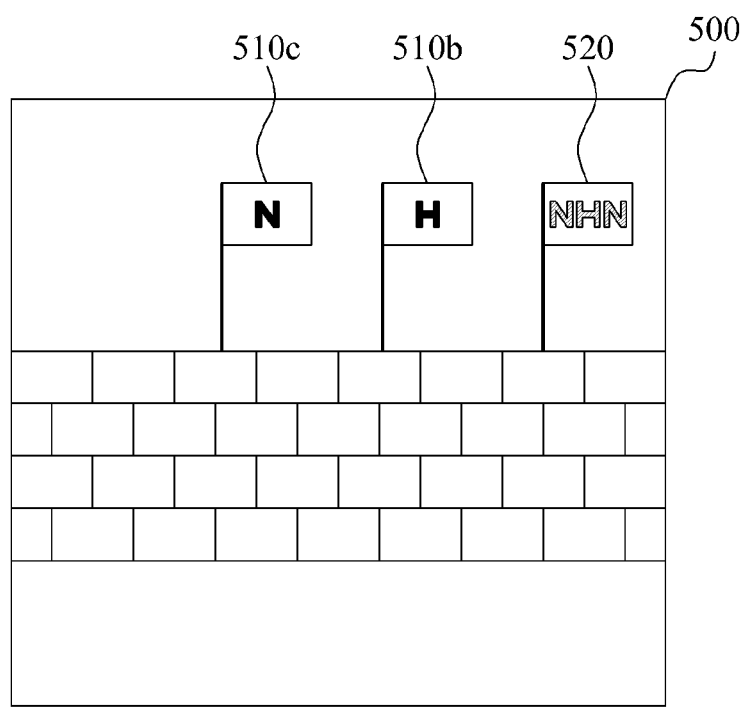

According to exemplary embodiments, the drawing changing module 130 may change the game object drawing information by hooking the game object drawing information so that a text of "A" displayed on a first flag 510a designated by a user (or advertiser) from among a plurality of flags 510a, 510b and 510c displayed on a game screen 500 of an on-line game illustrated in FIG. 4A may be changed to service object information 520 including a text of "NHN" as illustrated in FIG. 4B. In this example, the drawing changing module 130 may change "A" of the first flag 510a to "NHN", or change an entire first flag 510a to the service object information 520 of a flag type including a new text of "NHN".

Figure 4C:
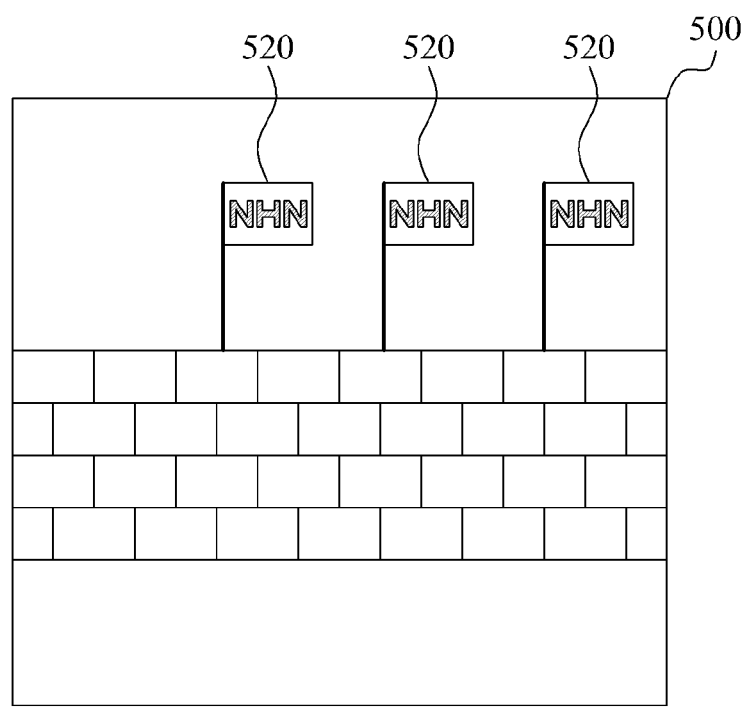
Figure 4D:
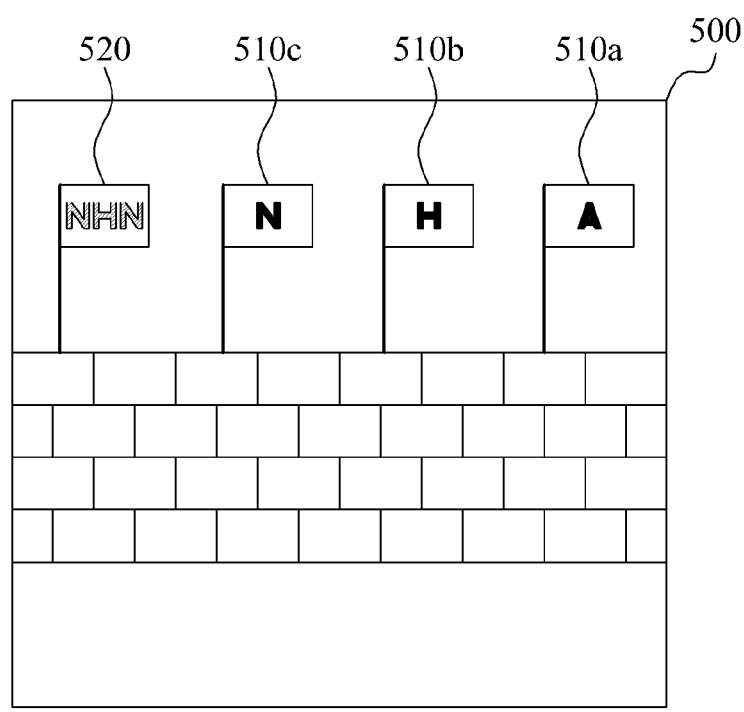

According to exemplary embodiments, the drawing changing module 130 may change the game object drawing information by hooking the game object drawing information so that each of 'A', 'H', and 'N' of the plurality of flags 510a, 510b and 510c illustrated in FIG. 4A may be changed to the service object information 520 including the text of "NHN" illustrated in FIG. 4C. In this example, since three coordinates to be replaced within a single game screen 500 exist, the drawing changing module 130 may partition the game screen 500 into a plurality of section regions using the OSP scheme, and detect the three coordinates to be replaced within each of the partitioned sectional regions.

According to exemplary embodiments, the drawing changing module 130 may insert the service object information 520 in the game object drawing information by hooking the game object drawing information so that the service object information 520 of a flag type including "NHN" may be displayed on specific regions adjacent to the plurality of flags 510a to 510c.

In FIG. 3, the drawing changing module 130 may detect and change the game object information using landmark information so that position information of the game object drawing information to be inserted or to be replaced may more rapidly be detected.

For this purpose, the game object information generation unit 402 of the drawing changing module 130 may further generate landmark information corresponding to the position information, and store the landmark information together with the game object information in the service information database 410.

Figure 5:
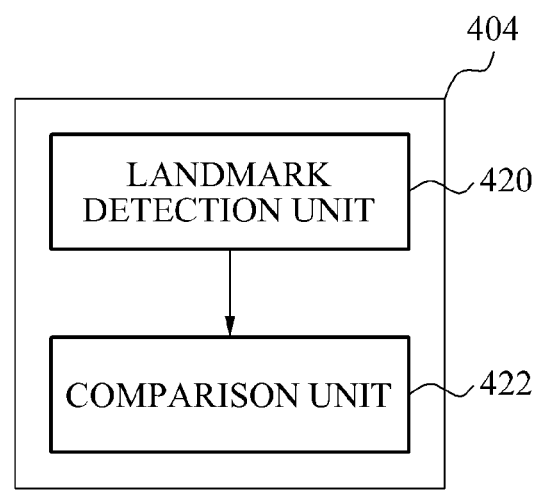
FIG. 5 is a diagram of a drawing information determination unit according to exemplary embodiments of the present invention.

Accordingly, the drawing information determination unit 404 may include a landmark detection unit 420 and a comparison unit 422, as illustrated in FIG. 5.

The landmark detection unit 420 may detect landmark information of each of the game object information and the service object information, and provide the detected landmark information to the comparison unit 422.

The comparison unit 422 may determine insertion or replacement of the service object information to provide the determined information to the drawing information changing unit 406, when the position information of the game object information and the position information of the service object information coincide with each other on the game world corresponding to the landmark information detected by the landmark detection unit 420 based on a comparison result between the position information of the game object information and the service object information.

As described above, the service providing system using the on-line game according to exemplary embodiments may insert the service object information in the specific region of the game screen, or replace the game object information with the service object information, and thus may dynamically insert the service object information in the game screen. Accordingly, the service object information may be inserted in the game screen in real time without modifying a program of the on-line game when executing the on-line game so that service application and service effect using the on-line game may be maximized.

Figure 6:
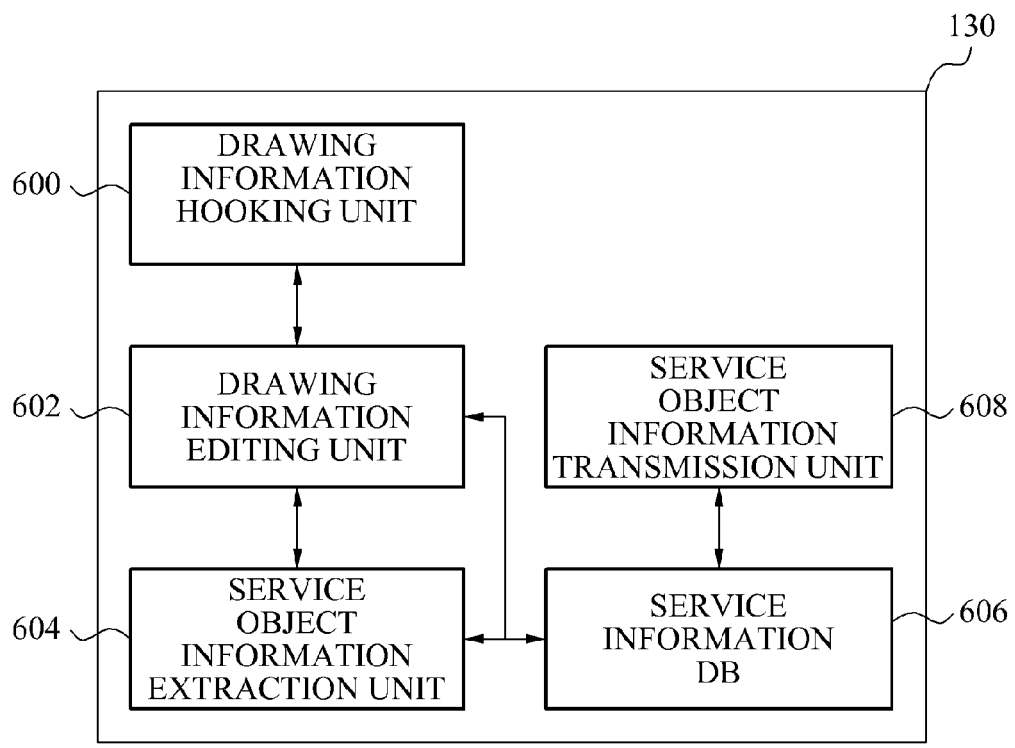
FIG. 6 is a diagram of a drawing changing module associated with an editing mode in a user client according to exemplary embodiments of the present invention.

FIG. 6 is a diagram of a drawing changing module 130 associated with an editing mode in the user client 100 according to exemplary embodiments of the present invention.

The drawing changing module 130 according to exemplary embodiments includes a drawing information hooking unit 600, a drawing information editing unit 602, a service object information extraction unit 604, a service information database 606, and a service object information transmission unit 608.

The drawing information hooking unit 600 may hook a specific region of a rendering region or game object drawing information, and provide the hooked information to the drawing information changing unit 602. In this example, the drawing information hooking unit 600 may hook the game object drawing information called by a rendering function of the rendering module 120 that is referred to as a drawcall function.

The drawing information editing unit 602 may edit the game object drawing information so that service object information may be inserted in the hooked specific region of the rendering region, or game object information of a game screen may be replaced with the service object information, in accordance with a selection of a user (or advertiser). Here, the drawing information changing unit 602 may change the game object information to the service object information, or insert the service object information in a specific region of the game screen, in accordance with the user's selection, as illustrated in FIG. 4A, FIG. 4B, FIG. 4C and FIG. 4D.

The service object information extraction unit 604 may generate the service object information of the game object drawing information edited by the drawing information editing unit 602, and store the generated information in the service information database 606. Here, the service object information may include one of position information, shape information, color information, text information, index information, or any combinations thereof of the game world for a service object.

According to exemplary embodiments, the service object information extraction unit 604 may partition the game world 140 into a plurality of section region information using an OSP scheme, and generate position information to enable the position information to include the sectional region information where the service object information is displayed, from among the partitioned plurality of section region information. In some examples, the service object information extraction unit 604 may partition a corresponding region into 8 sectional regions using the OSP scheme when a number of coordinate values to be replaced within the corresponding region is more than M. In this example, assuming that the game world 140 is a single hexahedron, each of the section regions may be partitioned once according to an x-axis direction, a y-axis direction, and a z-axis direction with respect to a center of a corresponding hexahedron. M may be adjustable, and the coordinate values to be replaced, ranging from a minimum number of 0 to a maximum number of M−1 which may exist within identical sectional region information in accordance with the OSP scheme. Accordingly, the service object information extraction unit 604 may store the position information together with the sectional region information in the service information database 410 where a unique sequence that is not overlapped with the partitioned sectional region information.

The service object information transmission unit 608 may transmit the service object information generated by the service object information extraction unit 604 to the game server 300.

The service object information transmitted from the service object information transmission unit 608 to the game server 300 may be transmitted to another user client 100 via the game server 300, and thus may be displayed on a corresponding game screen when performing the on-line game.

As described above, the drawing changing module 130 according to exemplary embodiments of the present invention may insert the service object information in the specific region of the game screen based on a user's selection by hooking the game object drawing information stored in the rendering region, or replace the game object drawing information with the service object information to transmit the replaced result to the game server 300, and thus the user may insert the service object information in the game screen in real time without modifying the program of the on-line game while playing the on-line game.

Figure 7:
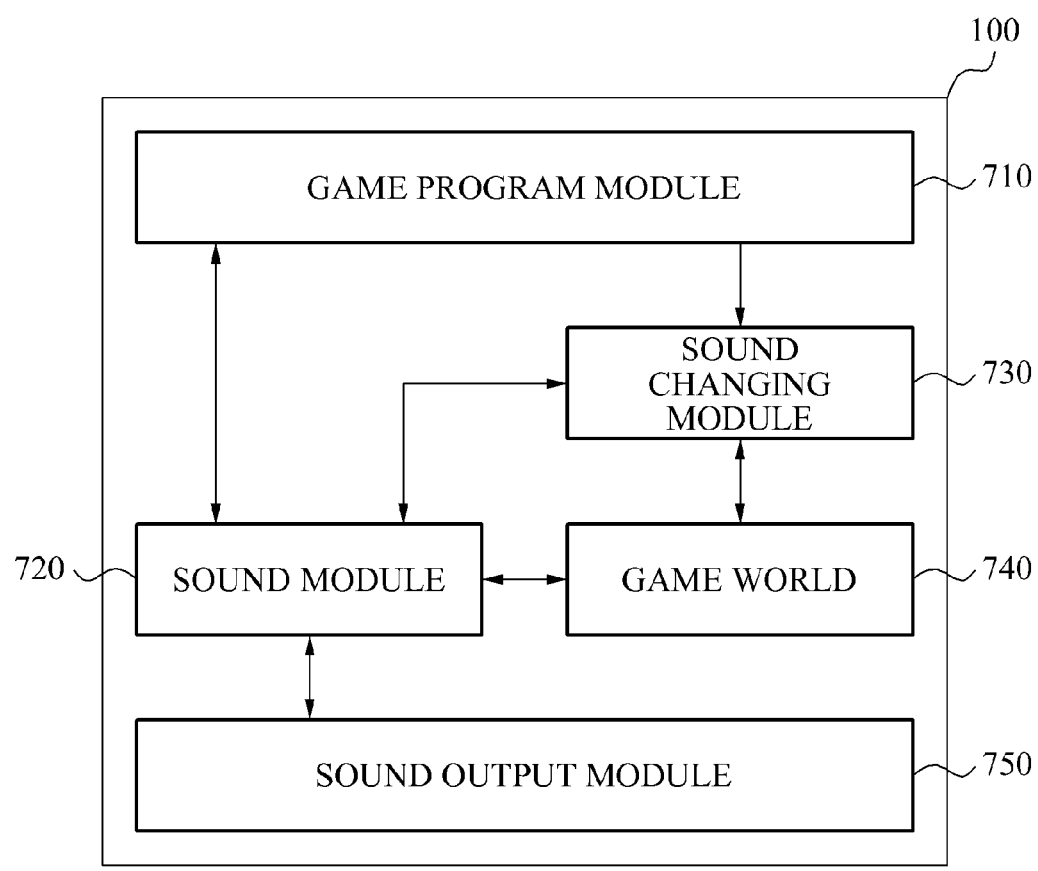
FIG. 7 is a diagram of a user client of a service providing system using an on-line game according to exemplary embodiments of the present invention.

FIG. 7 is a diagram illustrating a user client 100 of a service providing system using an on-line game according to a second embodiment of the present invention.

Referring to FIG. 1, FIG. 2, FIG. 3, FIG. 4A, FIG. 4B, FIG. 4C, FIG. 4D, FIG. 5, FIG. 6 and FIG. 7, the user client 100 includes a game program module 710, a sound module 720, a sound changing module 730, a game world 740, and a sound output module 750.

The game program module 710 may be installed in the user client 100, and request the sound module 720 to output corresponding game sound information within the on-line game.

The sound module 720 may control the corresponding game sound information to be outputted within the game screen via a communication with the game program module 710 and the sound output module 750.

For this purpose, the sound module 720 may store, in a sound region, game sound information of the game screen in response to the output request of the game program module 710. Also, the sound module 720 may request the sound output module 750 to output the game sound information stored in the sound region.

The sound module 720 may use, for example, a DirectX or an OpenGl for the purpose of effective sound output.

The sound changing module 730 may change the game sound information to enable service sound information provided from the game server to be included in the game sound information by hooking the sound region, and store the changed game sound information in the sound region.

The game world 740 may be a memory region where a game screen is displayed by a game application. The game world 140 may be updated in a predetermined time interval unit, and the sound module 720 may output, to the sound output module 750, the game sound information implemented in the game world 140, The sound output module 750 may output the service sound information stored in the sound region through a sound output device (not illustrated) in response to the sound output request of the sound module 720.

As described above, the user client 100 according to exemplary embodiments of the present invention may be configured differently depending on an editing mode for inserting the service sound information in the game screen, or a game player mode for outputting the service sound information inserted in the game screen by the editing mode. Alternatively, the user client 100 may be configured by simultaneously using the above two modes.

Figure 8:
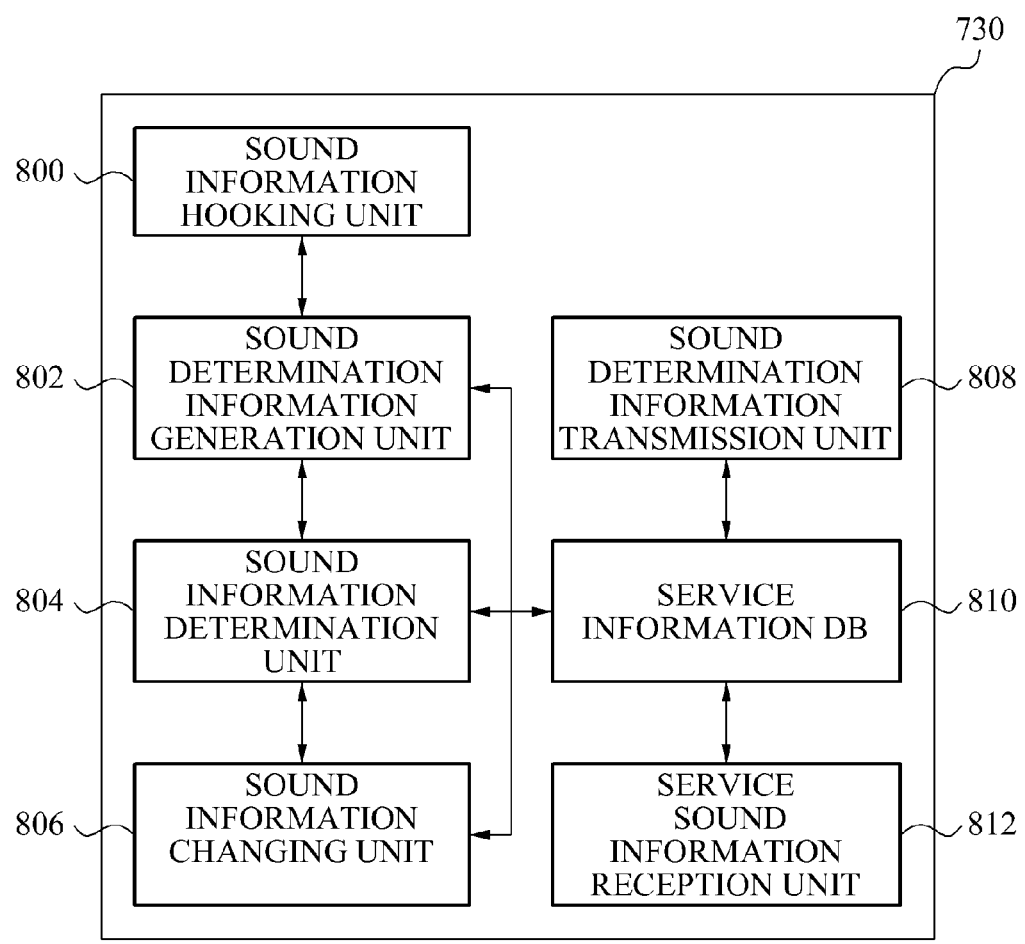
FIG. 8 is a diagram illustrating a sound changing module associated with a game player mode of a user client according to exemplary embodiments of the present invention.

FIG. 8 is a diagram illustrating a sound changing module associated with a game player mode of a user client 100 according to exemplary embodiments of the present invention.

Referring to FIG. 7 and FIG. 8, the sound changing module 730 includes a sound information hooking unit 800, a sound determination information generation unit 802, a sound information determination unit 804, a sound information changing unit 806, a sound determination information transmission unit 808, a service information database 810, and a service sound information reception unit 812.

The sound information hooking unit 800 may hook information with respect to a specific point in time of a sound region or game sound information to provide the hooked information to the sound determination information generation unit 802. In this example, the sound information hooking unit 800 may hook the game sound information in real time, using a sound factor used when calling a game sound. Here, the sound factor, for example, may be stream buffer parameters and stream buffer hash.

Also, the sound information hooking unit 800 may store, in the sound region, game sound information changed by the sound information changing unit 806.

The sound determination information generation unit 802 may generate sound determination information including the hooked information with respect to the specific point in time of the sound region or including information associated with a point in time of the game sound information, and store, in the service information database 810, the generated sound determination information.

The sound information determination unit 804 may determine whether the game sound information is changed when information associated with a point in time of the sound determination information stored in the service information database 810 and information associated with a point in time of the service sound information coincide with each other based on a comparison between the respective points in time.

The sound information changing unit 806 may change the game sound information so that the service sound information may be inserted into the on-line game at the specific point in time of the sound region, or the game sound information may be replaced with the service sound information.

The sound determination information transmission unit 808 may transmit, to the game server 300, the sound determination information generated by the sound determination information generation unit 802.

The service sound information reception unit 812 may receive, from the game server 300, the service sound information corresponding to the sound determination information, and store the received service sound information in the service information database 810.

Figure 9A:
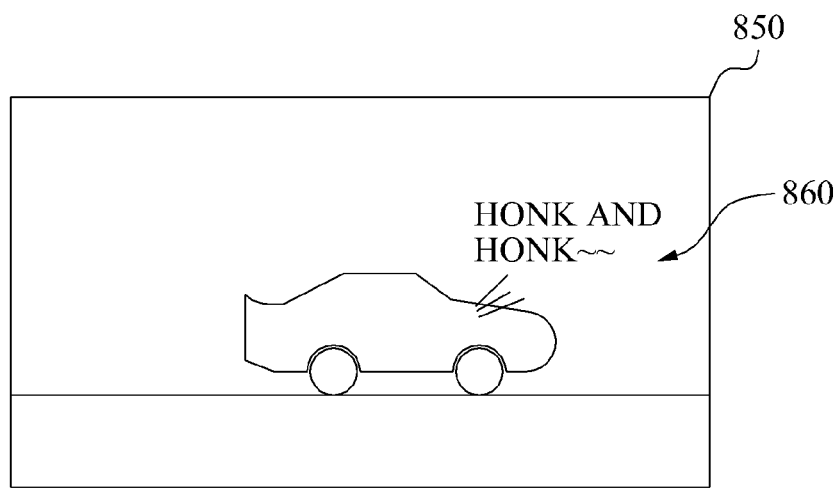
FIG. 9A to FIG. 9B are diagrams where service sound information is inserted in a service providing system using an on-line game according to exemplary embodiments of the present invention.
Figure 9B:
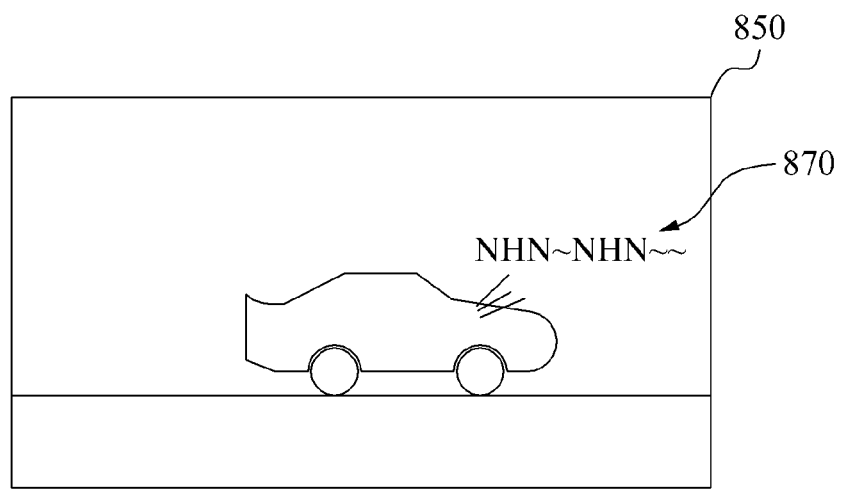

FIG. 9A and FIG. 9B are diagrams illustrating an insertion process of service sound information of a service providing system using an on-line game according to exemplary embodiments of the present invention.

In FIG. 9A and FIG. 9B, it is assumed that a honking sound of a vehicle displayed on a game screen of an on-line game is changed to service sound information.

According to exemplary embodiments, the sound changing module 730 may change, to service sound information 870 such as "NHN~NHN~" as illustrated in FIG. 9B, game sound information 860 such as a honking sound outputted from a vehicle of a game screen 850 of an on-line game illustrated in FIG. 9A, that is, "honk and honk", by hooking the sound information.

The sound changing module 730 may insert the service sound information 870 in a specific point in time of the sound region so that the service sound information 870 such as "NHN~NHN~" may be outputted after the output point in time of the game sound information 860 such as the honking sound outputted from the vehicle, that is, "honk and honk".

As described above, the service providing system using the on-line game according to exemplary embodiments of the present invention may insert the service sound information in the specific point in time within the game by hooking the game sound information stored in the sound region, or replace the game sound information with the service sound information, thereby dynamically inserting the service sound information in the on-line game. Accordingly, the service sound information may be inserted in the on-line game, in real time, without modifying a program of the on-line game while the on-line game is being played, thereby maximizing service application and service effect using the on-line game.

Figure 10:
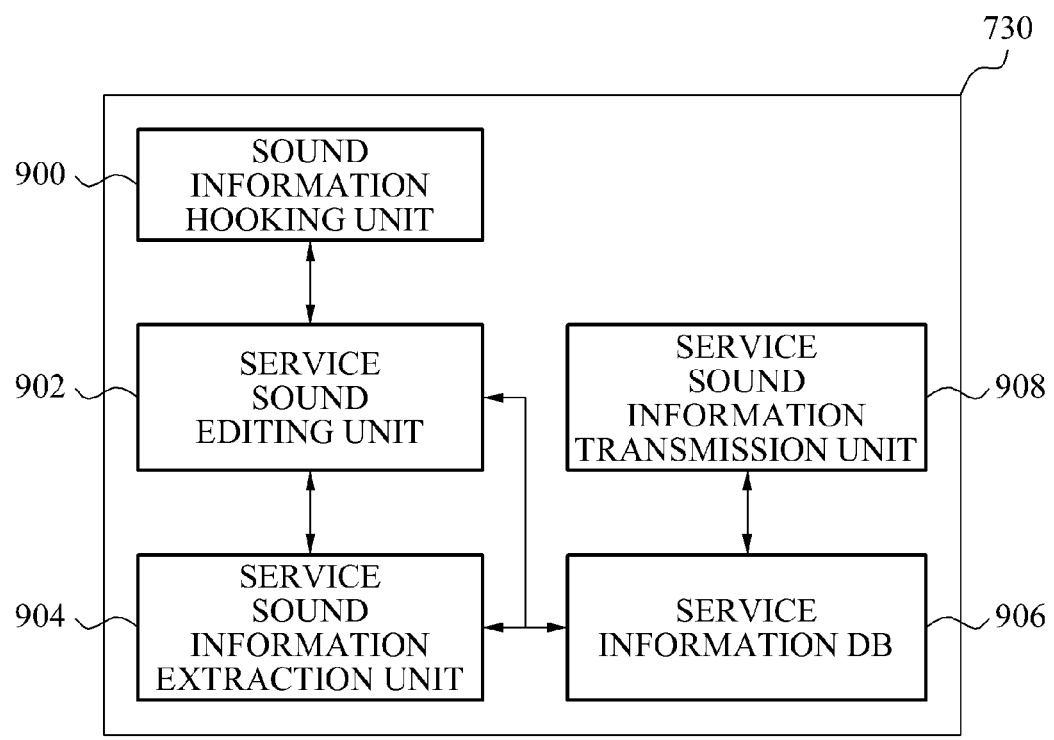
FIG. 10 is a diagram illustrating a sound changing module associated with an editing mode of a user client according to exemplary embodiments of the present invention.

FIG. 10 is a diagram illustrating a sound changing module 730 associated with an editing mode of a user client 100 according to exemplary embodiments of the present invention.

Referring to FIG. 7 and FIG. 10, the sound changing module 730 includes a sound information hooking unit 900, a sound information changing nit 902, a service sound information extraction unit 904, a service information database 906, and a service sound information transmission unit 908.

The sound information hooking unit 900 may hook information associated with a specific point in time of a sound region or game sound information, and provide, to the sound information changing unit 902, the hooked information. In this example, the sound information hooking unit may hook the game sound information in real time, using a sound factor used when calling a game sound. Here, the sound factor, for example, may be stream buffer parameters and a stream buffer hash.

Also, the sound information hooking unit 900 may store the game sound information changed by the sound information changing unit 902 of the sound region.

The sound information editing unit 902 may edit the game sound information so that service sound information may be inserted into the on-line game at the specific point in time of the sound region, or the game sound information may be replaced with the service sound information, depending on a user's (advertiser's) selection. Here, as illustrated in FIG. 9A and FIG. 9B, the sound information editing unit 902 may change the game sound information within the on-line game to the service sound information, or insert the service sound information in the specific point in time within the on-line game, depending on the user's selection.

The service sound information extraction unit 904 may extract the service sound information included in the game sound information edited by the sound information editing unit 902, and store the extracted service sound information in the service information database 906.

The service sound information transmission unit 908 may transmit, to the game server 300, the service sound information extracted by the service sound information extraction unit 904.

The service sound information transmitted from the service sound information transmission unit 908 to the game server 300 may be transmitted to another user client 100 via the game server 300 so that the service sound information may be outputted corresponding to a point in time when the on-line game is being played.

As described above, based on a user's selection, the sound changing module 730 may insert the service sound information in the specific point in time within the on-line game by hooking the game sound information stored in the sound region, or replace the game sound information with the service sound information to transmit the replaced result to the game server 300 so that a user may insert the service sound information in the on-line game, in real time, without modifying a program of the on-line game even while playing the on-line game.

Figure 11:
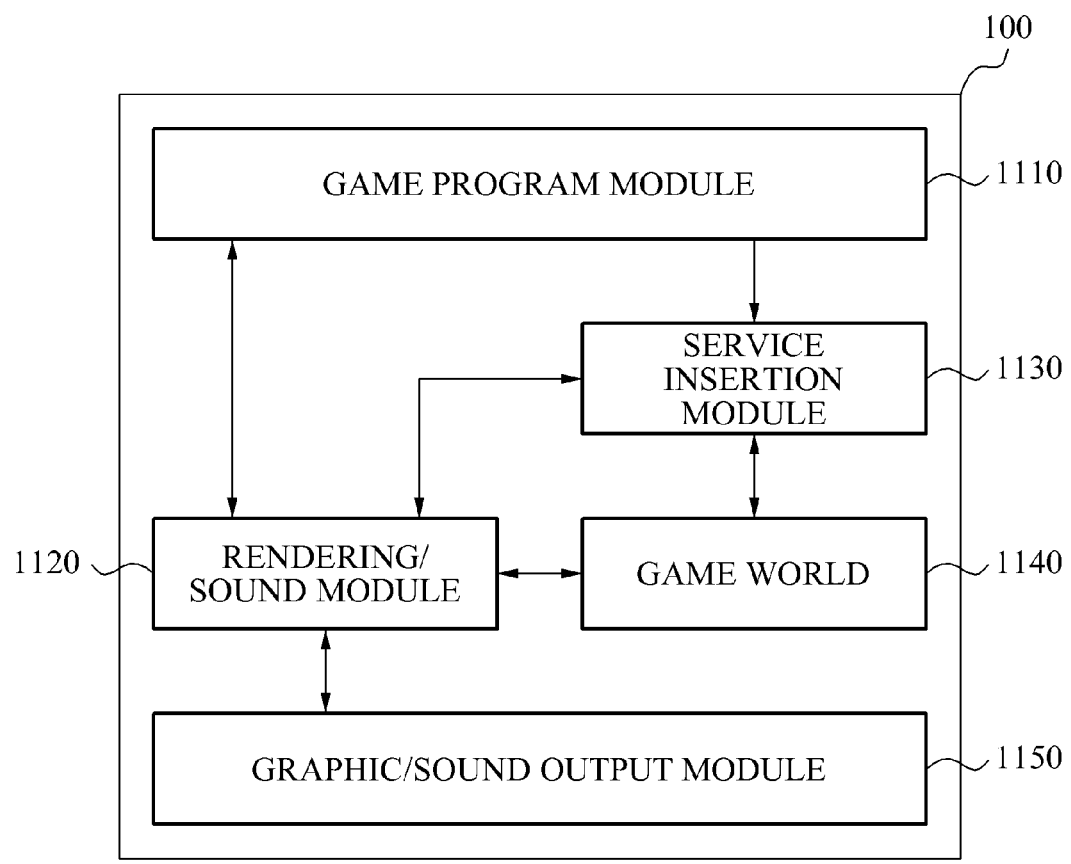
FIG. 11 is a diagram of a user client of a service providing system using an on-line game according to exemplary embodiments of the present invention.

FIG. 11 is a diagram of a user client of a service providing system using an on-line game according to exemplary embodiments of the present invention.

Referring to FIG. 11, the user client 100 according to exemplary embodiments includes a game program module 1110, a rendering/sound module 1120, a service insertion module 1130, a game world 1140, and a graphic/sound output module 1150.

The game program module 1110 may be installed in the user client 100, and request a reproduction of a game screen for the on-line game, and game object drawing information of the game screen and game sound information may be provided to a user via the graphic/sound output module 1150.

The rendering/sound module 1120 may be configured by a combination of the rendering module 120 of FIG. 2 and the sound module 720 of FIG. 7, and may perform the same operations as those of the rendering module 120 and the sound module 720. Thus, further descriptions of the rendering/sound module 1120 may be omitted in order to avoid unnecessarily obscuring the invention.

Figure 12:
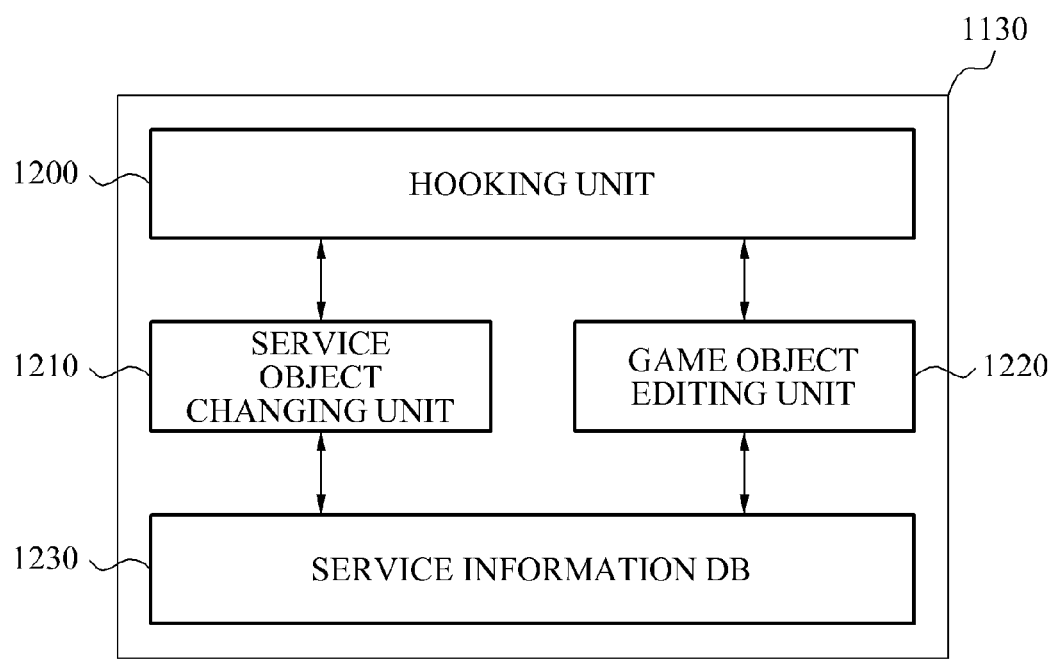
FIG. 12 is a diagram of a service insertion module of FIG. 11.

As illustrated in FIG. 12, the service insertion module 1130 includes a hooking unit 1200, a service object changing unit 1210, a game object editing unit 1220, and a service information database 1230.

As described above, the hooking unit 1200 may hook the game object drawing information stored in the rendering region and/or the game sound information stored in the sound region to provide the hooked information to the service object changing unit 1210 or the game object editing unit 1220.

Also, the hooking unit 1200 may store, in the rendering region, the game object drawing information changed by the service object changing unit 1210 or the game object editing unit 1220, or store, in the sound region, the game sound information changed by the service object changing unit 1210 or the game object editing unit 1220.

The service object changing unit 1210 may change, to the service object information, the game object drawing information provided from the hooking unit 1200, or change, to the service sound information, the game sound information provided from the hooking unit 1200.

Figure 13:
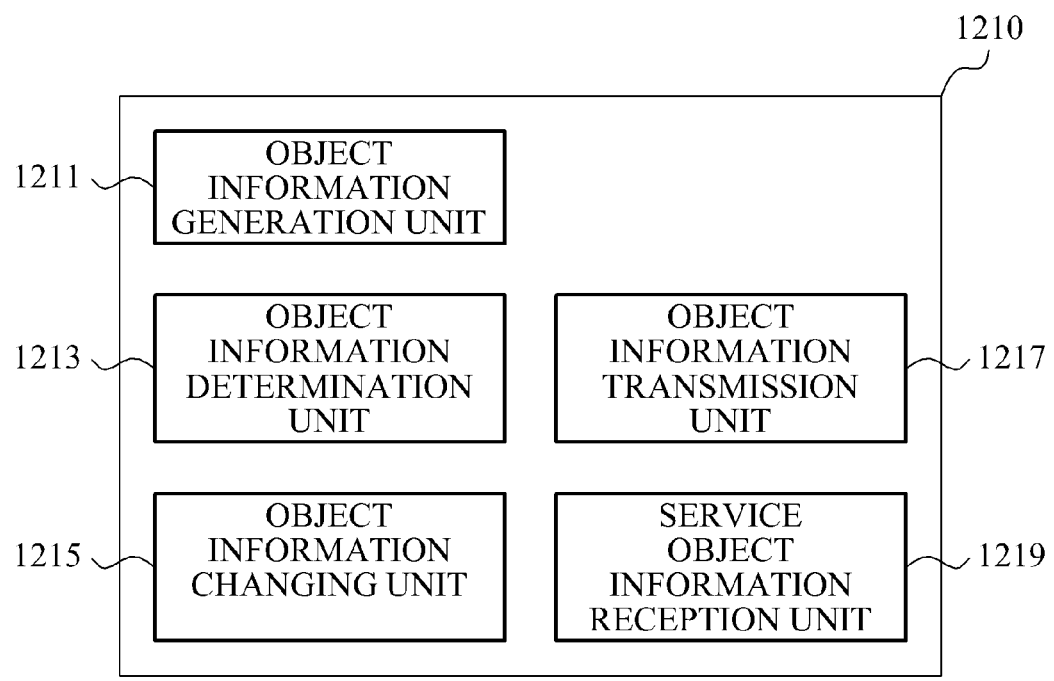
FIG. 13 is a diagram of a service object changing unit of FIG. 11.

According to exemplary embodiments, as illustrated in FIG. 13, the service object changing unit 1210 includes an object information generation unit 1211, an object information determination unit 1213, an object information changing unit 1215, an object information transmission unit 1217, and a service object information reception unit 1219.

The object information generation unit 1211 may generate game object information corresponding to game object drawing information when the game object drawing information is provided from the hooking unit 1200. Also, the object information generation unit 1211 may generate sound determination unit corresponding to game sound information when the game sound information is provided from the hooking unit 1200. The object information generation unit 1211 may integrally perform functions of the game object information generation unit 402 of FIG. 3 and the sound determination information generation unit 802 of FIG. 8. And further descriptions may be omitted in order to avoid unnecessarily obscuring the invention.

The object information generation unit 1211 may further generate landmark information corresponding to position information of the game object information, and store, in the service information database 1230, the game object information and the generated landmark information.

The object information determination unit 1213 may determine whether the game object drawing information is changed, by comparing the game object information stored in the service information database 1230 and the service object information. Also, the object information determination unit 1213 may determine whether the game sound information is changed, when the sound determination information stored in the service information database 1230 and the service sound information coincide with each other based on a comparison between the sound determination information and the service sound information. The object information determination unit 1213 may integrally perform functions of the drawing information determination unit 404 of FIG. 3 and the sound information determination unit 804 of FIG. 8, and thus further descriptions thereof may be omitted in order to avoid unnecessarily obscuring the invention.

The object information determination unit 1213 may determine insertion or replacement of the service object information when position information of the game object information on the game world corresponding to the landmark information generated by the object information generation unit 1211 and position information of the service object information coincide with each other based on a comparison between the respective position information.

The object information changing unit 1215 may change the game object drawing information so that the service object information may be inserted in a hooked specific region of the rendering region based on the determination result of the object information determination unit 1213, or the game object information may be replaced with the service object information. Also, the object information changing unit 1215 may change the game sound information so that the service sound information may be inserted into the on-line game at a specific point in time of the sound region based on the determination result of the object information determination unit 1213, or the game sound information may be replaced with the service sound information. The object information changing unit 1215 may integrally perform the drawing information changing unit 406 of FIG. 3 and the sound information changing unit 806 of FIG. 8, and thus further description thereof will be omitted in order to avoid unnecessarily obscuring the invention.

The object information transmission unit 1217 may transmit, to the game server 300, the game object information and/or the sound determination information that is generated by the object information generation unit 1211 and stored in the service information database 1230.

The service object information reception unit 1219 may receive service object information corresponding to the game object information provided from the game server 300, and/or service sound information corresponding to the sound determination information provided from the game server 300, and store the received information in the service information database 1230.

The game object editing unit 1220 may replace the game object drawing information provided from the hooking unit 1200 with the service object information based on a user's selection, or replace the game sound information provided from the hooking unit 1200 with the service sound information to insert the service object information and/or the service sound information in the on-line game, and transmit, to the game server 300, the inserted service object information and/or the inserted service sound information.

Figure 14:
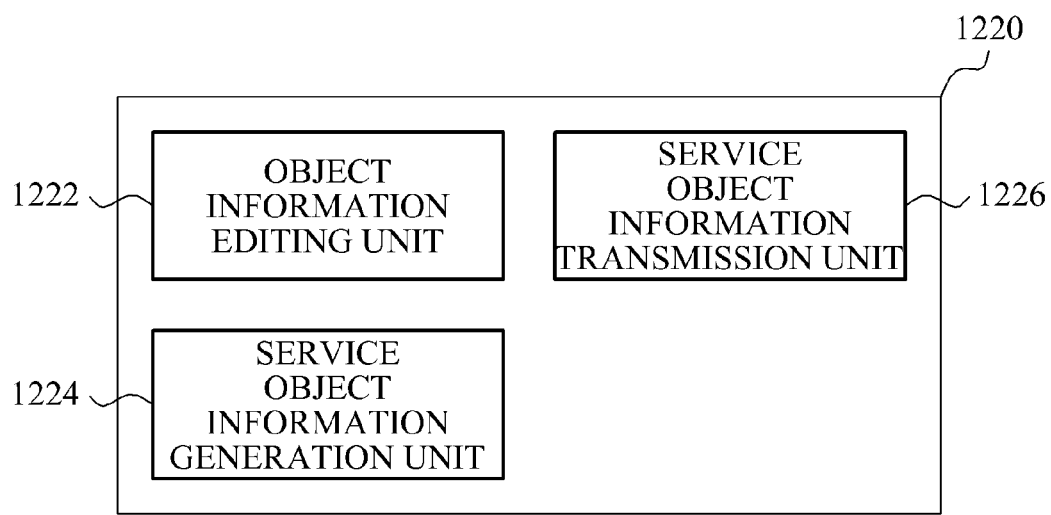
FIG. 14 is a diagram of a game object editing unit of FIG. 11.

According to exemplary embodiments, as illustrated in FIG. 14, the game object editing unit 1220 includes an object information editing unit 1222, a service object information extraction unit 1224, and a service object information transmission unit 1226.

The object information editing unit 1222 may edit the game object drawing information so that the service object information may be inserted in the hooked specific region of the rendering region based on a user's (advertiser's) selection, or the game object information may be replaced with the service object information. Here, as illustrated in FIG. 4A, FIG. 4B, FIG. 4C and FIG. 4D, the object information editing unit 1222 may change the game object information of the game screen to the service object information based on the user's selection, or insert the service object information in the specific region of the game screen.

Also, the object information editing unit 1222 may edit the game sound information so that the service sound information may be inserted in the hooked specific region of the sound region based on a user's selection, or the game sound information may be replaced with the service sound information.

The service object information extraction unit 1224 may extract the service object information included in the game object drawing information edited by the object information editing unit 1222, and store the extracted service object information in the service information database 1230.

Also, the service object information extraction unit 1224 may extract the service sound information included in the game sound information edited by the object information editing unit 1222, and store the extracted service sound information in the service information database 1230.

The service object information transmission unit 1226 may transmit, to the game server 300, the service object information and/or the service sound information that are extracted by the service object information extraction unit 1224.

The service object information and/or the service sound information that are transmitted from the service object information transmission unit 1226 to the game server 300 may be transmitted to another user client 100 via the game server 300, and thus may be transmitted to a user when the user is playing the on-line game.

In FIG. 11, the graphic/sound output module 1150 may integrally operate functions of the graphic output module 150 of FIG. 2 and the sound output module 750 of FIG. 7, and thus further descriptions thereof will be omitted in order to avoid unnecessarily obscuring the invention.

As described above, the user client 100 of the service providing system using the on-line game according to exemplary embodiments of the present invention may insert or replace the service object information and/or the service sound information by hooking the game object drawing information and/or the game sound information using the service insertion module 1130, thereby dynamically inserting the service object information and/or the service sound information in the on-line game as illustrated in FIG. 4A, FIG. 4B, FIG. 4C and FIG. 4D and/or in FIG. 9A to FIG. 9B. Accordingly, the service object information and/or the service sound information may be inserted in the game screen in real time without modifying the game program while the on-line game is being played, and thereby maximizing service application and service effect.

Figure 15:
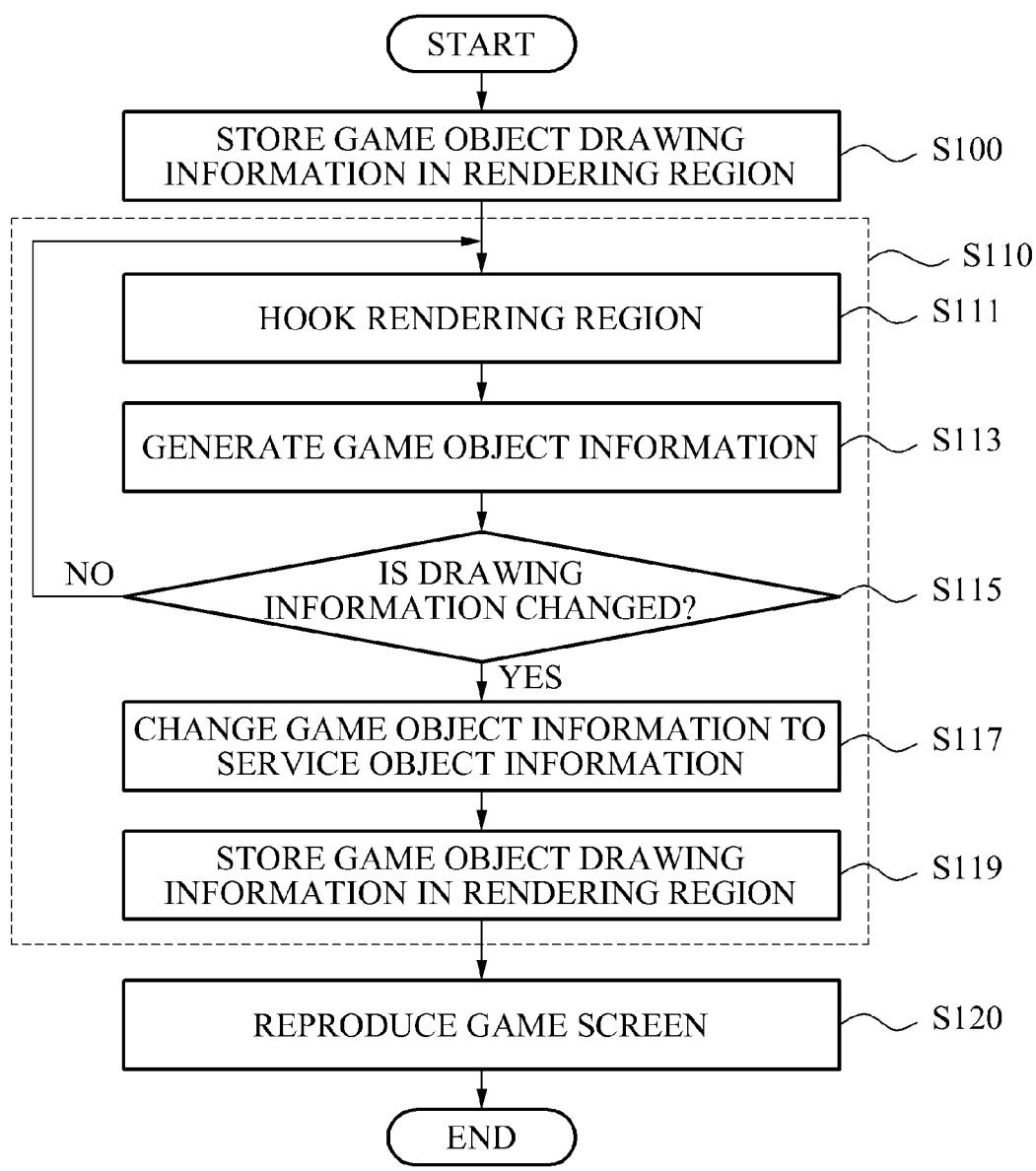
FIG. 15 is a flowchart of a process of a service providing method using an on-line game according to exemplary embodiments of the present invention.

FIG. 15 is a flowchart of a process of a service providing method using an on-line game according to exemplary embodiments of the present invention.

Referring to FIG. 1, FIG. 2, FIG. 3, FIG. 4A, FIG. 4B, FIG. 4C, FIG. 4D and FIG. 15, the service providing method will be described in a stepwise manner.

As in step S100, the service providing method may store, in a rendering region, to game object drawing information of a game screen for the on-line game in response to a request of the game program module 110 for reproducing the game screen.

In step S110, the service providing method may change the game object drawing information to enable service object information provided from the game server 300 to be included in the game object drawing information by hooking the rendering region using the drawing changing module 130, and store the changed game object drawing information in the rendering region.

In step S120, the service providing method may render the service object information stored in the rendering region, using the rendering module 120, and reproduce the rendered service object information in the game screen.

Hereinafter, the S110 is described in detail.

In step S111, the drawing information hooking unit 400 may hook a specific region of the rendering region or the game object drawing information, using the drawing information hooking unit 400.

In step S113, the game object information generation unit 402 may analyze the hooked game object drawing information to extract a game object, and generate the game object information for the extracted game object to store the generated game object information in the service information database 410.

According to exemplary embodiments, the game object information and the service object information may include at least one of position information, shape information, size information, color information, texture information, and index information, on a game world.

According to exemplary embodiments, the position information may include sectional region information, where the game object information or the service object information is displayed, from among a plurality of sectional region information partitioned in the game world in an OSP scheme.

In step S115, the drawing information determination unit 404 may determine whether the game object drawing information is changed by comparing the game object information stored in the service information database 410 and the service object information.

According to exemplary embodiments, in step S116, the service providing method may determine insertion or replacement of the service object information when position information of the game object information and position information of the service object information coincide with each other within the section region information based on a comparison between the respective position information.

When the position information of the game object information and the position information of the service object information do not coincide with each other in operation per step S115 ('NO' branch of operation S115), the service providing method may repeatedly perform steps of S111, S112, S113, S114 and S115 until the respective position information coincide with each other.

When the position information of the game object information and the position information of the service object information coincide with each other in step S115 ('YES' branch of operation S115), the service providing method may change the game object drawing information in operation S117 so that the service object information may be inserted in the hooked specific region of the rendering region, or the game object information may be replaced with the service object information, as illustrated in FIG. 4A, FIG. 4B, FIG. 4C and FIG. 4D. Here, the service object information may be at least one of an image, a moving picture, or a texture.

In step S119, the drawing information hooking unit 400 may store the changed game object drawing information in the rendering region.

The service providing method using the on-line game according to a first embodiment of the present invention may further include transmitting, to the game server 300, the game object information generated in the game object information generation unit 402, using the drawing information transmission unit 408, receiving, from the game server 300, the service object information corresponding to the game object information, using the drawing information reception unit 412, and storing the received service object information in the service information database 410.

As described above, the service providing method using the on-line game according to a exemplary embodiments of the present invention may insert the service object information in the specific region of the game screen, or replace the game object drawing information with the service object information, by hooking the game object drawing information stored in the rendering region, and thus dynamically inserting the service object information in the game screen. Accordingly, the service providing method may insert the service object information in the game screen in real time, without modifying the program of the on-line game while the on-line game is being played, and thereby maximizing service application and service effect using the on-line game.

Figure 16:
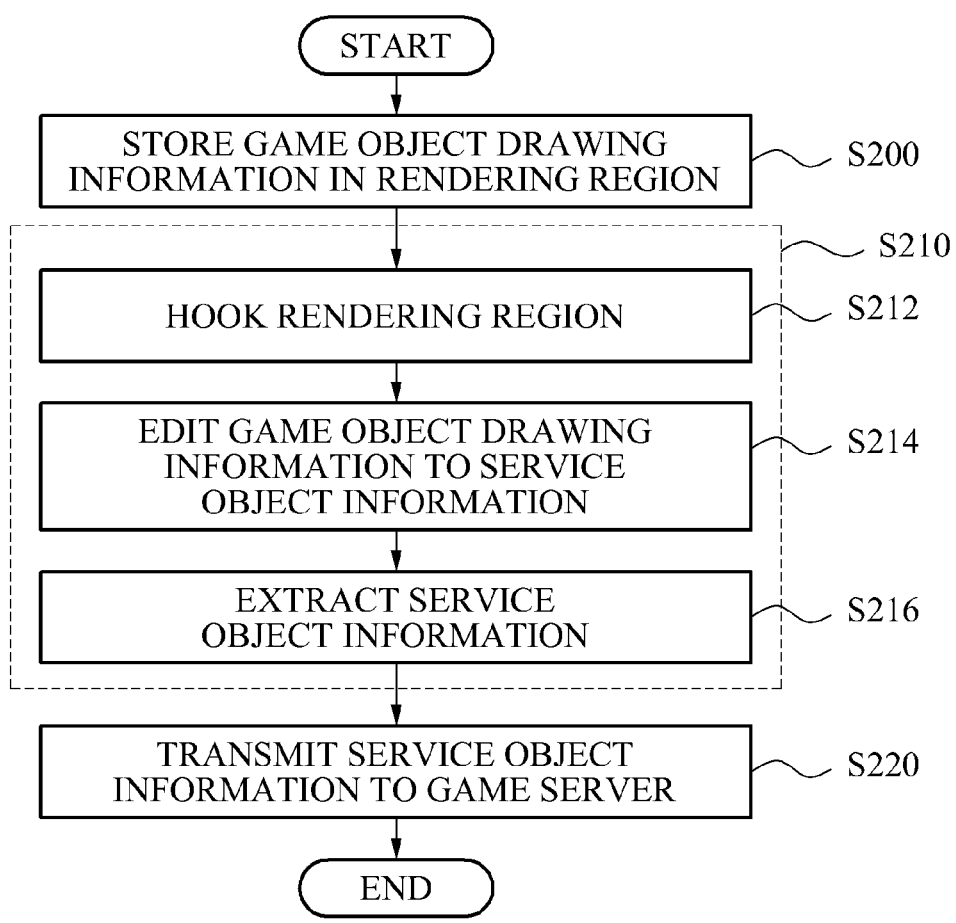
FIG. 16 is a flowchart of a process of a service providing method using an on-line game according to exemplary embodiments of the present invention.

FIG. 16 is a flowchart of a process of a service providing method using an on-line game according to exemplary embodiments of the present invention.

Hereinafter, the service providing method according to the exemplary embodiments is described in a stepwise manner with reference to FIG. 1, FIG. 6, and FIG. 16.

In step S200, the service providing method may store, in a rendering region, game object drawing information of a game screen for the on-line game in response to a request of the game program module 110 for reproducing the game screen.

In step S210, the service providing method may hook the rendering region using the drawing changing module 130, and edit the game object drawing information to enable service object information to be included in the game object drawing information based on a user's selection.

In step S220, the service object information transmission unit 608 of the drawing changing module 130 may transmit, to the game server 300, the service object information included in the game object drawing information.

Hereinafter, the step S210 is described in detail.

In step S212, the drawing information hooking unit 600 may hook a specific region of the rendering region or the game object drawing information.

In step S214, the drawing information editing unit 602 may edit the game object drawing information so that the service object information may be inserted in the hooked specific region of the rendering region based on a user's selection, or the game object drawing information may be replaced with the service object information.

When a user selects the hooked game object drawing information as a replacement object in step S214, the service object information may be inserted in the specific region of the rendering region, or the game object drawing information may be replaced with the service object information.

In step S216, the service object information extraction unit 604 may extract the service object information included in the game object drawing information.

As described above, the service providing method using the on-line game according to exemplary embodiments of the present invention may insert, by hooking the game object drawing information stored in the rendering region based on a user's selection, the service object information in the specific region of the game screen, or replace the game object drawing information with the service object information, and transmit the replacement result to the game server 300 and thus, the user may insert a service object in the game screen in real time without modifying the program of the on-line game even when the on-line game is played.

Figure 17:
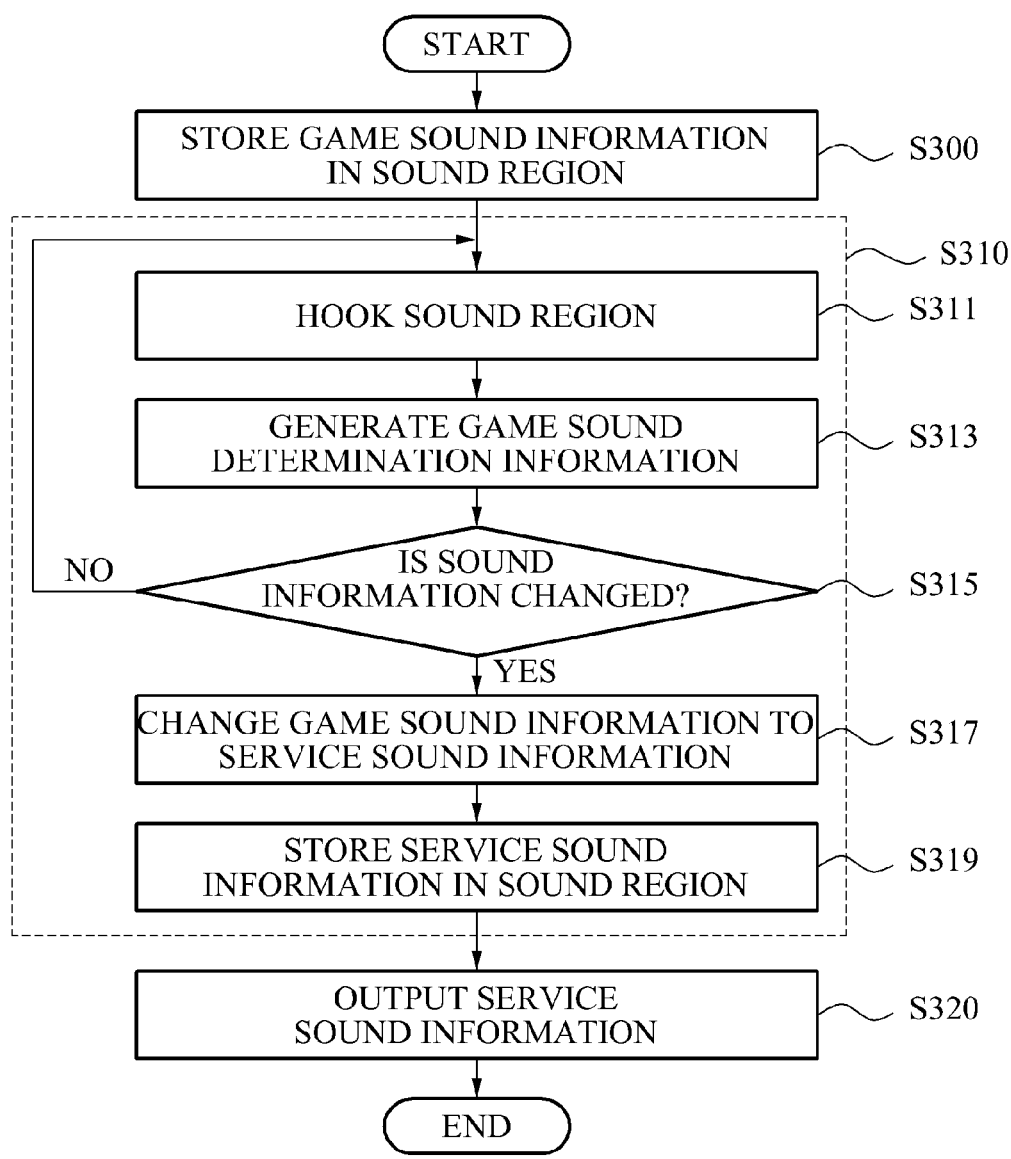
FIG. 17 is a flowchart of a process of a service providing method using an on-line game according to exemplary embodiments of the present invention.

FIG. 17 is a flowchart illustrating a service providing method using an on-line game according to exemplary embodiments of the present invention.

Hereinafter, with reference to FIG. 1, FIG. 7, FIG. 8, FIG. 9A, FIG. 9B, and FIG. 17, the service providing method according to exemplary embodiments is described in a stepwise manner.

In step S300, the service providing method may store, in a sound region, game sound information in response to a request of the game program module 110 for outputting game sound information corresponding to a game screen of the on-line game.

In step S310, using the sound changing module 730, the service providing method may hook the sound region, and change the game sound information to enable service sound information provided from the game server 300 to be included in the game sound information, and store the changed game sound information in the sound region.

In step S320, using the sound output module 750, the service providing method may output the service sound information stored in the sound region, at a point in time within a corresponding game.

Hereinafter, operation S310 is described in detail.

In step S311, the sound information hooking unit 800 may hook information associated with a specific point in time of the sound region or the game sound information.

In step S313, the sound determination information generation unit 802 may generate game sound determination information including information associated with a point in time of the game sound information by analyzing the hooked game sound information, and store the generated game sound determination information in the service information database 810.

In step S315, the sound information determination unit 804 may determine whether the game sound information is changed by comparing the game sound determination information stored in the service information database 810 and the service sound information.

According to exemplary embodiments, in step S315, when information associated with the point in time of the game sound determination information and information associated with the point in time of the service sound information coincide with each other, insertion or replacement of the service sound information may be determined.

When the information associated with the point in time of the game sound determination information and the information associated with the point in time of the service sound information do not coincide with each other ('NO' branch of step 315), the steps S311, S312, S313, S314 and S315 may repeatedly be performed until the point in time of the game sound determination information and the point in time of the service sound information coincide with each other.

When the point in time of the game sound determination information and the point in time of the service sound information coincide with each other ('YES' branch of step 315), the sound information changing unit 806 may change the game sound information so that the service sound information may be inserted into the on-line game at the specific point in time of the sound region, or the game sound information may be replaced with the service sound information, as illustrated in FIG. 4A, FIG. 4B, FIG. 4C and FIG. 4D.

In step S319, the sound information hooking unit 800 may store the changed game sound information in the sound region.

As described above, the service providing method using the on-line game according to exemplary embodiments of the present invention may insert, by hooking the game sound information stored in the sound region, the service sound information in the specific point in time within the game, or replace the game sound information with service sound information, thereby dynamically inserting the service sound information in the game. Accordingly, the service sound information may be inserted in the game in real time without modifying the program of the on-line game when the on-line game is played, and thereby maximizing service application and service effect.

Figure 18:
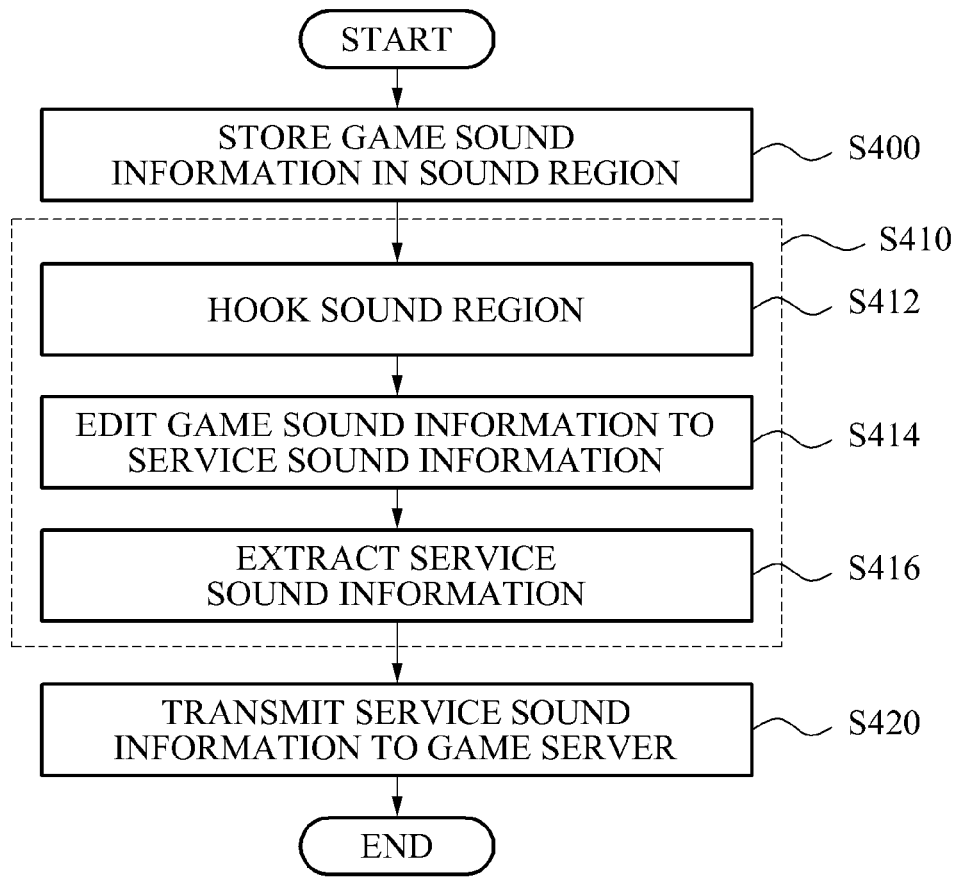
FIG. 18 is a flowchart of a process of a service providing method using an on-line game according to exemplary embodiments of the present invention.

FIG. 18 is a flowchart of a process of a service providing method using an on-line game according to exemplary embodiments of the present invention.

Hereinafter, the service providing method will be described in a stepwise manner with reference to FIG. 1, FIG. 10, and FIG. 18.

In step S400, the service providing method may store, in a sound region, game sound information in response to a request of the game program module 110 for outputting the game sound information corresponding to a game screen for the on-line game.

In step S410, using the sound changing module 730, the service providing method may hook the sound region, and edit the game sound information stored in the hooked sound region based on a user's selection so that the game sound information may include the service sound information.

In step S420, the service providing method may transmit, to the game server 300, the service sound information included in the edited game sound information.

Hereinafter, step S410 is described in detail.

In step S412, the sound information hooking unit 900 may hook a specific point in time of the sound region or the game sound information.

In step S414, the service sound editing unit 902 may edit the game sound information so that the service sound information is inserted in the specific point in time based on the user's selection, or the game sound information may be replaced with the service sound information.

When the user selects the hooked game sound information as a replacement object in step S414, the service sound information may be inserted in the specific point in time of the sound region, or the game sound information may be replaced with the service sound information.

In step S416, the service sound information extraction unit 904 may extract the service sound information included in the game sound information.

According to embodiments of the present invention, it is possible to insert service object information in a specific region of a game screen by hooking game object drawing information stored in a rendering region, or to replace the game object drawing information with the service object information, thereby dynamically inserting the service object information in the game screen.

Also, according to embodiments of the present invention, it is possible to insert service sound information at a specific point in time within a game, by hooking game sound information stored in a sound region, or to replace the game sound information with the service sound information, thereby dynamically inserting the service sound information in the game screen.

Also, according to embodiments of the present invention, service information may be inserted in a game in real time without modifying a program of an on-line game when the on-line game is played, thereby maximizing a degree of service utilization and service effects.

One of ordinary skill in the art would recognize that the processes for providing and editing a service in an on-line game may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 19.

Figure 19:
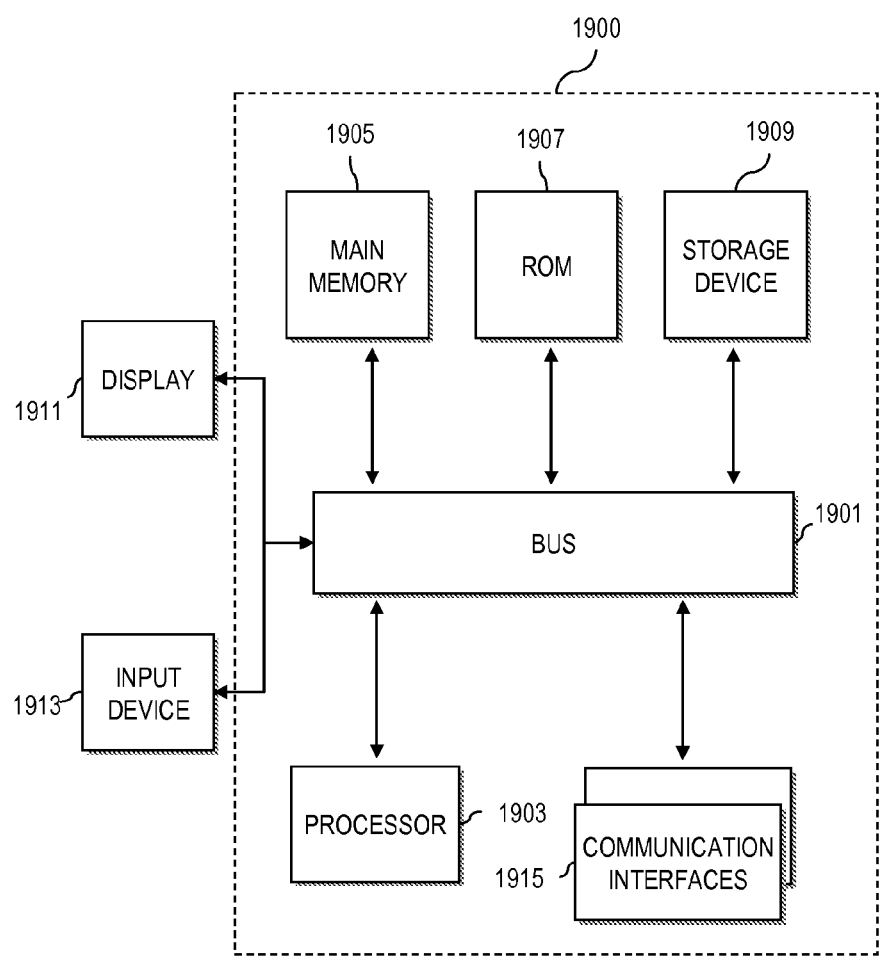
FIG. 19 is a diagram of hardware that can be used to implement exemplary embodiments of the present invention.

FIG. 19 illustrates exemplary hardware upon which various embodiments of the invention can be implemented. A computing system 1900 includes a bus 1901 or other communication mechanism for communicating information and a processor 1903 coupled to the bus 1901 for processing information. The computing system 1900 also includes main memory 1905, such as a random access memory (RAM) or other dynamic storage device, coupled to the bus 1901 for storing information and instructions to be executed by the processor 1903. Main memory 1905 can also be used for storing temporary variables or other intermediate information during execution of instructions by the processor 1903. The computing system 1900 may further include a read only memory (ROM) 1907 or other static storage device coupled to the bus 1901 for storing static information and instructions for the processor 1903. A storage device 1909, such as a magnetic disk or optical disk, is coupled to the bus 1901 for persistently storing information and instructions.

The computing system 1900 may be coupled with the bus 1901 to a display 1911, such as a liquid crystal display, or active matrix display, for displaying information to a user. An input device 1913, such as a keyboard including alphanumeric and other keys, may be coupled to the bus 1901 for communicating information and command selections to the processor 1903. The input device 1913 can include a cursor control, such as a mouse, a trackball, or cursor direction keys, for communicating direction information and command selections to the processor 1903 and for controlling cursor movement on the display 1911.

According to various embodiments of the invention, the processes described herein can be provided by the computing system 1900 in response to the processor 1903 executing an arrangement of instructions contained in main memory 1905. Such instructions can be read into main memory 1905 from another computer-readable medium, such as the storage device 1909. Execution of the arrangement of instructions contained in main memory 1905 causes the processor 1903 to perform the process steps described herein. One or more processors in a multi-processing arrangement may also be employed to execute the instructions contained in main memory 1905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1900 also includes at least one communication interface 1915 coupled to bus 1901. The communication interface 1915 provides a two-way data communication coupling to a network link (not shown). The communication interface 1915 sends and receives electrical, electromagnetic, or optical signals that carry digital data streams representing various types of information. Further, the communication interface 1915 can include peripheral interface devices, such as a Universal Serial Bus (USB) interface, a PCMCIA (Personal Computer Memory Card International Association) interface, etc.

The processor 1903 may execute the transmitted code while being received and/or store the code in the storage device 1909, or other non-volatile storage for later execution. In this manner, the computing system 1900 may obtain application code in the form of a carrier wave.

The term "computer-readable medium" as used herein refers to any medium that participates in providing instructions to the processor 1903 for execution. Such a medium may take many forms, including but not limited to non-volatile media, volatile media, and transmission media. Non-volatile media include, for example, optical or magnetic disks, such as the storage device 1909. Volatile media include dynamic memory, such as main memory 1905. Transmission media include coaxial cables, copper wire and fiber optics, including the wires that comprise the bus 1901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for providing a service using an on-line game, the method comprising:
    storing, in a rendering region, game object drawing information of a game screen in response to a request for reproducing the game screen;
    hooking the rendering region to change the game object drawing information to include service object information in the game object drawing information, wherein the game object drawing information comprises the service object information that is stored in the rendering region; and
    providing the game screen by rendering the game object drawing information comprising the service object information,
    wherein the hooking comprises,
    determining whether position information of game object information extracted from the game object drawing information and position information of the service object information coincide with each other within sectional region information, wherein the service object information is inserted in a predetermined region of the hooked rendering region, or the game object information is replaced with the service object information, and
    wherein the sectional region information comprises information of sectional region where the service object information is displayed of a plurality of section region partitioned in the game screen.

2. The method of claim 1, wherein the hooking the rendering region comprises:
    hooking a region of the rendering region or the game object drawing information;
    extracting a game object by analyzing the hooked game object drawing information to generate game object information for the extracted game object, and to store the generated game object information in a database;
    determining whether the game object drawing information is replaced by comparing the game object information stored in the database and the service object information;
    changing the game object drawing information, wherein the service object information is inserted in the hooked predetermined region of the rendering region or the game object information that is replaced with the service object information; and
    storing the replaced game object drawing information in the rendering region.

3. The method of claim 2, wherein the changing of the game object drawing information comprises:
    transmitting the game object information to the game server; and
    receiving, from the game server, the service object information corresponding to the game object information, and storing the received service object information in the service information database.

4. The method of claim 2, wherein each of the game object drawing information and the service object information comprises one of position information, shape information, size information, color information, texture information, index information or any combinations thereof.

5. The method of claim 4, wherein the position information comprises sectional region information where the game object information and the service object information are displayed from among a plurality of section region information partitioned by an Octree Space Partitioning (OSP) scheme.

6. The method of claim 5, wherein determining whether the game object drawing information is replaced associated with an insertion or a replacement of the service object information is made by comparing the position information of the game object information and the position information of the service object information with each other within the sectional region information, and by comparing the position information of the game object information and the position information of the service object information coincide with each other.

7. The method of claim 1, wherein the service object information is one of image information, moving picture information, texture information, or any combinations thereof.

8. The method of claim 4, wherein each of the game object information and the service object information comprise landmark information.

9. The method of claim 8, wherein the determining whether the game object drawing information is replaced comprises:
   detecting the landmark information of each of the game object information and the service object information; and
   determining insertion or replacement of the service object information by comparing the position information of the game object information and the position information of the service object information which correspond to the detected landmark information, and by comparing the position information of the game object information and the position information of the service object information whether to coincide with each other.

10. A method for providing a service using an on-line game, the method comprising:
    storing, in a rendering region, game object drawing information of a game screen in response to a request for reproducing the game screen;
    hooking the rendering region to change the game object drawing information stored in the hooked rendering region to include service objet information, wherein the service object information is included in the game object drawing information based on a user selection; and
    transmitting, to a game server, the replaced game object drawing information comprising the service object information,
    wherein the hooking comprises,
    determining whether position information of game object information extracted from the game object drawing information and position information of the service object information coincide with each other within sectional region information, wherein the service object information is inserted in a predetermined region of the hooked rendering region, or the game object information is replaced with the service object information, and
    wherein the sectional region information comprises information of sectional region where the service object information is displayed of a plurality of section region partitioned in the game screen.

11. The method of claim 10, wherein the hooking of the rendering region comprises:
    hooking a region of the rendering region or the game object drawing information; and
    changing the game object drawing information to insert the service object information in the hooked region of the rendering region or the game object information is replaced with the service object information, the changing is determined based on the user selection; and
    extracting the service object information of the replaced game object drawing information to store the extracted service object information in a database.

12. The method of claim 11, wherein the service object information comprises one of position information, shape information, size information, color information, texture information, index information, or any combinations thereof.

13. The method of claim 12, wherein the position information comprises sectional region information where the service object information is displayed from a plurality of sectional region information partitioned by an OSP scheme.

14. The method of claim 10, wherein the service object information is one of image information, moving picture information, texture information, or any combinations thereof.

15. The method of claim 12, wherein the service object information comprises landmark information corresponding to the position information.

* * * * *